（12） United States Patent
Curci et al.

(10) Patent No.: US 7,175,270 B2
(45) Date of Patent: Feb. 13, 2007

(54) FLEXIBLE FRAME ASSEMBLY FOR EYEGLASSES

(75) Inventors: Raymond Curci, Smithfield, RI (US); Laurent Froissard, Cranston, RI (US); Michael J. Jobin, Boston, MA (US); Gregor Mittersinker, Warwick, RI (US)

(73) Assignee: Bacou-Dalloz Eye & Face Protection, Inc., Smithfield, RI (US)

( * ) Notice: Subject to any disclaimer, the term of this patent is extended or adjusted under 35 U.S.C. 154(b) by 0 days.

(21) Appl. No.: 11/141,473

(22) Filed: May 31, 2005

(65) Prior Publication Data

US 2005/0270476 A1    Dec. 8, 2005

Related U.S. Application Data

(60) Provisional application No. 60/576,367, filed on Jun. 2, 2004.

(51) Int. Cl.
G02C 1/00    (2006.01)
(52) U.S. Cl. ........................................................ 351/41
(58) Field of Classification Search ................ 351/41, 351/86, 83, 106, 103, 111, 158
See application file for complete search history.

(56) References Cited

U.S. PATENT DOCUMENTS

| 1,510,001 | A | 9/1924 | Gunning | |
|---|---|---|---|---|
| 2,117,139 | A | 5/1938 | Bouchard | |
| 2,269,037 | A | 1/1942 | Oker | |
| 2,609,278 | A | 9/1952 | Eyles | |
| 2,609,570 | A | 9/1952 | Danielson et al. | |
| 2,624,907 | A | 1/1953 | Graham | |
| 3,000,049 | A | 9/1961 | Terry, Jr. | |
| 3,027,598 | A | 4/1962 | Neefe | |
| 3,406,232 | A | 10/1968 | Barker | |
| 3,591,669 | A | 7/1971 | Memory | |
| 3,649,106 | A | 3/1972 | Hirschmann, Jr. | 351/122 |
| 3,744,888 | A | 7/1973 | Bogyos | 351/178 |
| 3,978,189 | A | 8/1976 | Einhorn | 264/250 |
| 4,034,955 | A | 7/1977 | Wallace | 249/137 |
| 4,265,850 | A | 5/1981 | Coulon et al. | 264/225 |
| 4,290,181 | A | 9/1981 | Jackson | 29/458 |
| 4,305,644 | A | 12/1981 | Drlik | 351/153 |
| 4,422,995 | A | 12/1983 | Schad | 264/250 |
| 4,448,741 | A | 5/1984 | Schad | 264/251 |
| 4,571,209 | A | 2/1986 | Manning et al. | 446/375 |
| 4,579,709 | A | 4/1986 | Ferreri | 264/242 |
| 4,800,123 | A | 1/1989 | Boeckeler | 428/424.2 |

(Continued)

*Primary Examiner*—Hung Xuan Dang
(74) *Attorney, Agent, or Firm*—Barlow, Josephs & Holmes, Ltd.

(57) ABSTRACT

A novel frame construction for eyeglasses is provided wherein the upper frame member is formed to have greatly enhanced flexibility to increase the overall adjustability, comfort and fit of the eyeglasses. The upper frame member includes areas wherein the material is selectively weakened to create predetermined flex points periodically within the frame member. Additionally, the weakened areas may be filled and/or covered with a second material that is more flexible than the base material used to form the frame member. The enhanced flexibility allows the upper frame member to flex as the temple members of the eyeglasses are stretched outwardly providing a comfortable fit for a wide range of wearers. Further, the top edge of the eyeglass lens may include formations that provide clearance for the deflection of the top frame member.

15 Claims, 17 Drawing Sheets

U.S. PATENT DOCUMENTS

| | | | |
|---|---|---|---|
| 4,890,356 A | 1/1990 | Czech et al. | 16/228 |
| 5,274,404 A | 12/1993 | Michael | 351/126 |
| 5,298,215 A | 3/1994 | Krause | 264/242 |
| 5,428,410 A | 6/1995 | Lei | 351/47 |
| 5,457,505 A | 10/1995 | Canavan et al. | 351/120 |
| 5,631,718 A | 5/1997 | Markovitz et al. | 351/119 |
| 5,737,055 A | 4/1998 | Dittmeier | 351/138 |
| 5,890,235 A | 4/1999 | Wiedner et al. | 2/431 |
| 5,900,922 A | 5/1999 | Moore | 351/103 |
| 6,066,282 A | 5/2000 | Kramer | 264/251 |
| 6,089,709 A | 7/2000 | Fairclough | 351/103 |
| 6,131,336 A | 10/2000 | Krause et al. | 49/74.1 |
| 6,159,092 A | 12/2000 | Elder | 454/155 |
| 6,196,681 B1 | 3/2001 | Canavan | 351/106 |
| 6,280,030 B1 | 8/2001 | Chen | 351/86 |
| 6,367,927 B2 | 4/2002 | Yang | 351/103 |
| 6,454,407 B2 | 9/2002 | Mille | 351/153 |
| 6,561,647 B1 | 5/2003 | Chen | 351/103 |
| 6,611,991 B2 | 9/2003 | Okeke et al. | 16/225 |
| 6,652,793 B2 | 11/2003 | Corrion et al. | 264/242 |
| 6,666,554 B2 * | 12/2003 | Mulvey | 351/107 |
| 6,939,004 B1 * | 9/2005 | Chen | 351/106 |
| 2004/0032564 A1 | 2/2004 | Meiler | 351/121 |

* cited by examiner

FLEXIBLE FRAME ASSEMBLY FOR EYEGLASSES

CROSS-REFERENCE TO RELATED APPLICATIONS

This application is related to and claims priority from earlier filed provisional patent application No. 60/576,367, filed Jun. 2, 2004.

BACKGROUND OF THE INVENTION

The present invention relates generally to eyewear assemblies and methods of manufacturing eyewear assemblies. More specifically, the present invention relates to safety eyewear assemblies that are manufactured utilizing multi-shot molding techniques to achieve unique manufacturing and assembly advantages.

In the prior art, there are a large variety of different types of protective eyeglasses that are available for protecting a user's eyes when engaging in hazardous activities. Generally, however, most of these protective eyeglasses are not adapted to be both comfortably worn and adjustable to fit different wearers. Accordingly, wearers have been forced to wear uncomfortable, poorly fitting protective eyewear, resulting in wearers that disregard proper safety procedures and fail to wear protective eyewear.

Several prior attempts have been made to manufacture protective eyeglasses that include various degrees of adjustability and the use of multiple material types to enhance the wearability of the eyeglasses. For background, reference is generally made to U.S. Pat. No. 5,457,505, issued to Canavan, Wiedner et al U.S. Pat. No. 5,890,235, and Canavan U.S. Pat. No. 6,196,681 each of which describe a safety eyewear construction, the collective specifications of which are incorporated herein by reference. U.S. Pat. No. 5,457,505, issued to Canavan, for example, provides one type of adjustable protective eyeglasses that is adjustable to fit various wearers, wherein the temple frame pieces are angularly adjustable about substantially horizontal pivot axes relative to the lens frame piece and longitudinally adjustable to different lengths. As can be seen however, when manufacturing this type of adjustable protective eyeglasses, a large number of separate pieces are required to provide the necessary joints and degrees of freedom needed within structure of the eyeglasses in order to provide the stated adjustability.

Similarly, U.S. Pat. No. 5,890,235 provides an eyeglass construction that provides for adjustable length temple frame pieces and the ability to angularly adjust the temple frame pieces relative to the brow bar. However, the lens in this construction does not provide for free floating ends, instead, it is pinned at notches 10 (see FIG. 7). Further, several separate pieces must be molded and subsequently assembled thereby increasing the complexity of the assembly process.

U.S. Pat. No. 6,196,681, issued to Canavan discloses a unitary structure made by a two-shot process in a single mold wherein a hard frame member is molded to which a secondary soft material is molded and chemically bonded to form soft contact areas along the inner portion of the brow bar and at the nose portions. In this manner, a soft material is provided to contact the wearer while hard material is provided to engage ratchet adjustment pieces as well as a transparent lens structure adapted to cover the eyes of a wearer.

The difficulty with these prior art protective eyeglasses is that each one is only an incremental improvement and none of them provide a comprehensive solution for manufacturing protective eyeglass that are universally adjustable for individual users while also being comfortable to wear and have a reduced number of individual parts to facilitate assembly.

There is therefore a need for a protective eyeglass construction that facilitates comfort for the user thereby increasing the likelihood that the protective eyeglasses will be worn by the user. Further, there is a need for a highly adjustable protective eyeglass construction that allows the eyeglasses to be universally adjustable for all users while also having a reduced number of individually formed parts to enhance the manufacturability of the assembly.

BRIEF SUMMARY OF THE INVENTION

In this regard, the present invention provides a novel construction for protective eyeglasses that includes numerous points of articulation thereby allowing the eyeglasses to be highly adjustable to suit the needs of virtually all users of the eyeglasses. Further, the present invention utilizes complex, multi-step injection molding techniques to form in-mold-assembly (IMA) components that are then incorporated into the finished eyeglasses thereby reducing complexity and overall assembly steps.

Briefly, the protective eyewear comprises a brow bar adapted to receive and support a lens, a noise piece adapted to be snap received into the nose bridge of the lens, and two temple bar assemblies that are snap received into the terminal ends of the brow bar. Among the unique features of the eyewear of the present invention is a centrally anchored lens which allows the terminal ends of the brow bar to free float relative to the lens and to flex outwardly. This ability to flex allows the brow to deflect as the temple bar assemblies are moved outwardly further allowing the eyewear to adjust to larger heads.

Additionally, the present invention utilizes novel multi-shot molding techniques to provide various hinge connections and telescoping parts that are all sequentially formed inside the mold cavity during molding to create IMA sub-assemblies that do not require any additional assembly steps once removed from the mold cavity. In the preferred embodiment disclosed herein, the molding techniques are particularly important in the formation of adjustable elastomeric nose pads on the nose-piece of the inventive eyewear, as well as in the formation of the temple bar assemblies that include a ratchet adjustment, hinge, and telescoping cables. Additionally, the multi-shot molding techniques are effective for providing soft cushion materials on the inner side of the brow bar, and lens bumpers on the outer side of the brow bar.

Accordingly, it is an object of the present invention to provide safety eyewear products that are at least partially assembled in-the-mold using novel multi-shot molding techniques. It is a further object of the present invention to provide safety eyewear having a flexible brow bar to accommodate different size heads. It is yet a further object of the present invention to provide protective eyewear that includes multiple articulated joints that increase the overall adjustability of the eyewear to enhance comfort and wearability of the eyeglasses.

Other objects, features and advantages of the invention shall become apparent as the description thereof proceeds when considered in connection with the accompanying illustrative drawings.

BRIEF DESCRIPTION OF THE DRAWINGS

In the drawings which illustrate the best mode presently contemplated for carrying out the present invention.

DETAILED DESCRIPTION OF THE INVENTION

Figure 1:
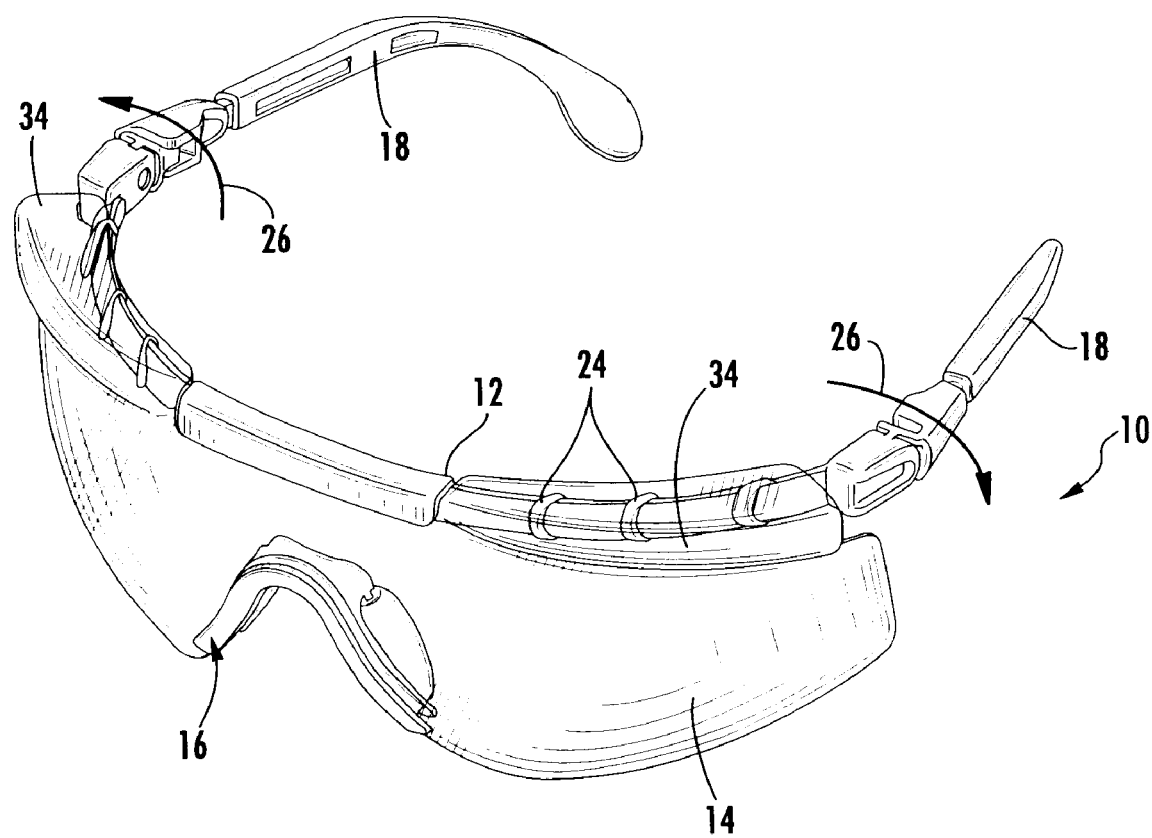
FIG. 1 is a front perspective view of the safety eyewear of the present invention with the lens shown as transparent.

Now referring to the drawings, a preferred embodiment of the safety eyewear of the instant invention is illustrated and generally indicated at 10 in FIGS. 1–9. As will hereinafter be more fully described, the safety eyewear 10 includes a brow bar 12 that is adapted to receive and support a lens 14, a nose piece 16 that is adapted to be snap received into the nose bridge of the lens 14, and two temple bar assemblies 18 that are snap received into the terminal ends of the brow bar 12.

The invention utilizes novel multi-shot molding techniques to provide hinge connections and telescoping parts that are formed inside the mold cavity during molding (In-Mold-Assembly or IMA) and thus do not require any additional assembly once the part is removed from the mold cavity. In the preferred embodiment disclosed herein, the molding techniques are particularly important in the formation of adjustable elastomeric nose pads on the nose piece of the eyewear as well as in the integral formation of the temple bar assemblies including a ratchet body, hinge body, and telescoping cables.

Figure 6:
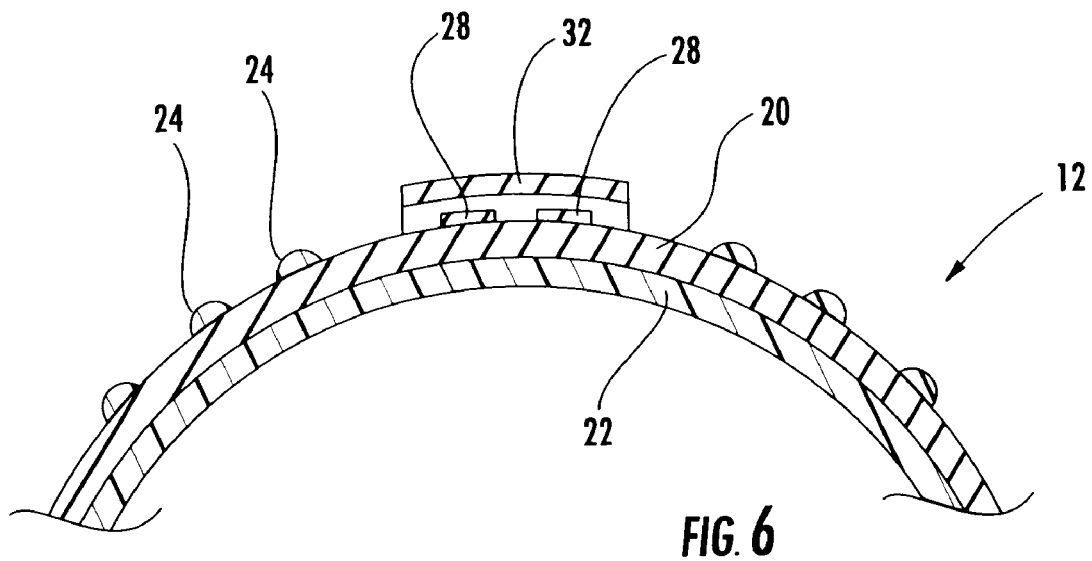
FIG. 6 is cross sectional view of the brow bar.

Turning to FIG. 1 in combination with FIG. 6, the brow bar 12 is the central structural element of the eyewear assembly 10. The brow bar 12 is formed using a two shot molding process wherein a hard portion 20 is first molded to provide rigidity and strength and thereafter a soft elastomeric portion 22 is molded over and bonded to the hard portion 20 to provide a soft cushion on the inside surface of the brow bar 12. The soft elastomeric material also wraps around the front surface of the brow bar 12 in selected locations to form soft bumpers 24 between the inner surface of the lens and the outer surface of the brow bar 12, thereby cushioning the brow bar 12 as it flexes forward and preventing a rattling sound as it contacts the lens 14. In addition to wrapping around the brow bar 12, through holes (not shown) may be provided through the brow bar to allow the elastomeric material to flow through the brow bar 12 as a means to assist in forming the soft bumpers 24 on the face of the brow bar 12 and to provide additional means for retaining the soft bumpers 24 on the brow bar 12.

Figure 2:
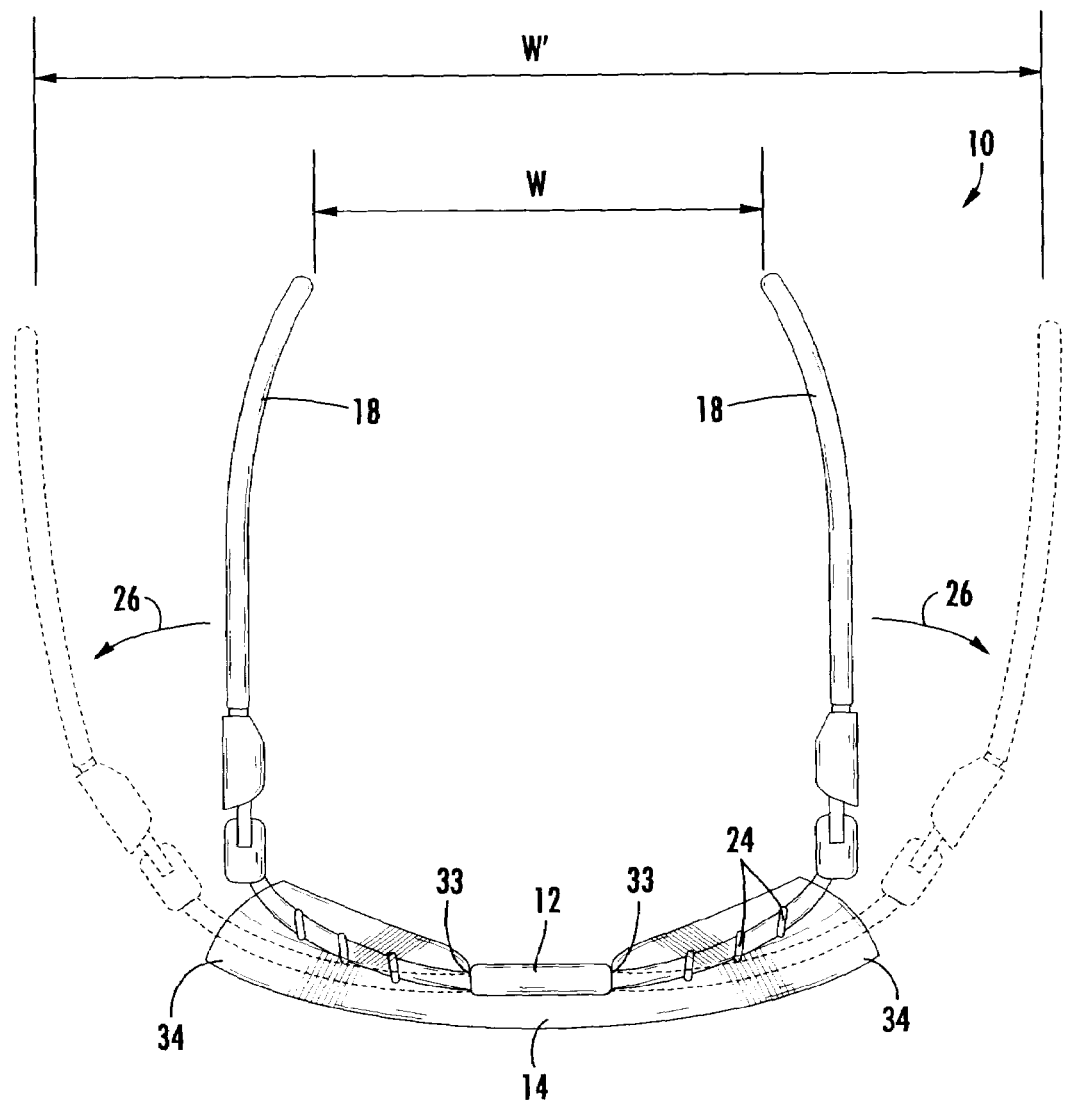
FIG. 2 is a top view thereof illustration temples in normal and flexed positions.
Figure 3:
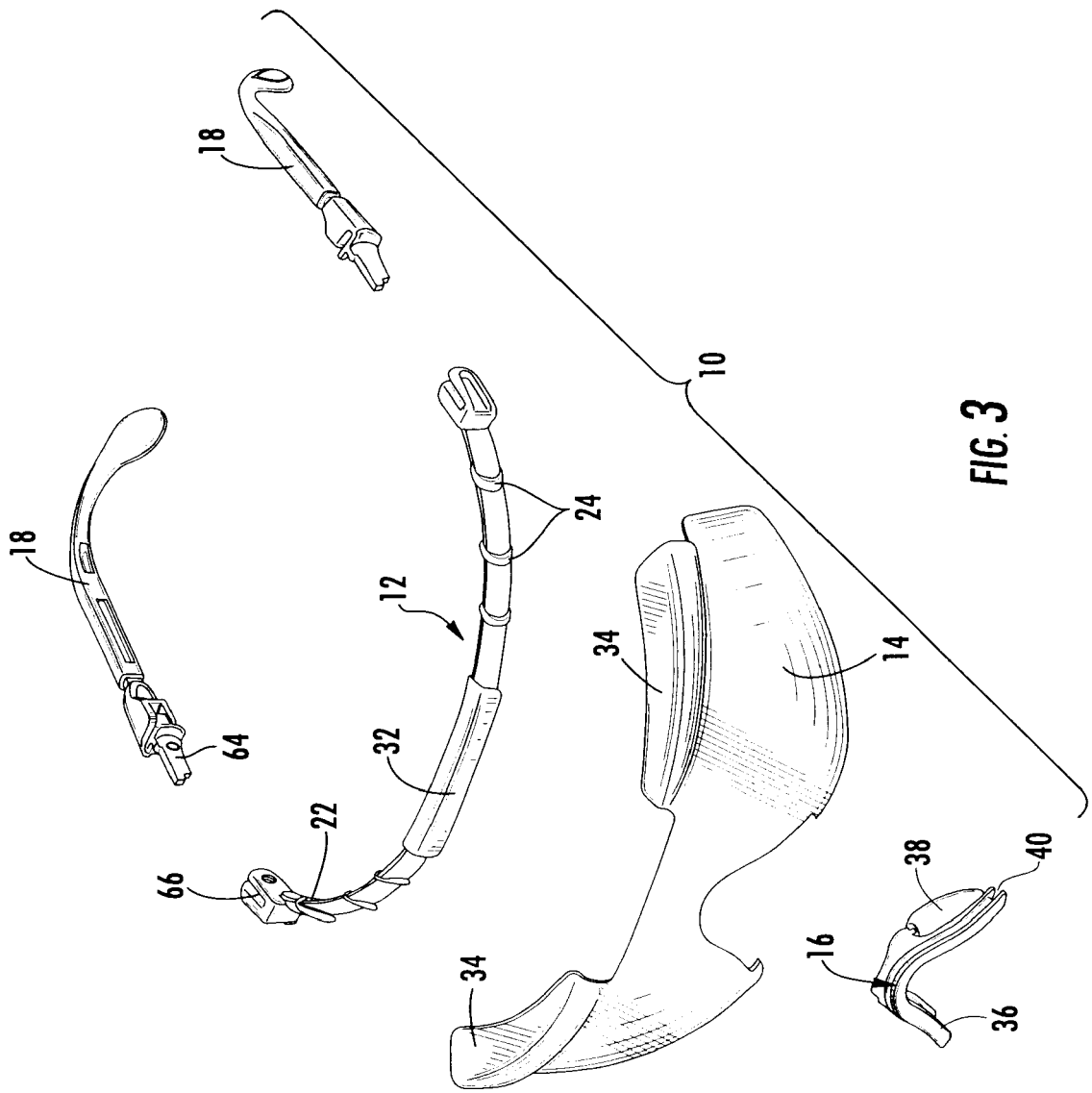
FIG. 3 is an exploded front perspective view thereof.
Figure 4:
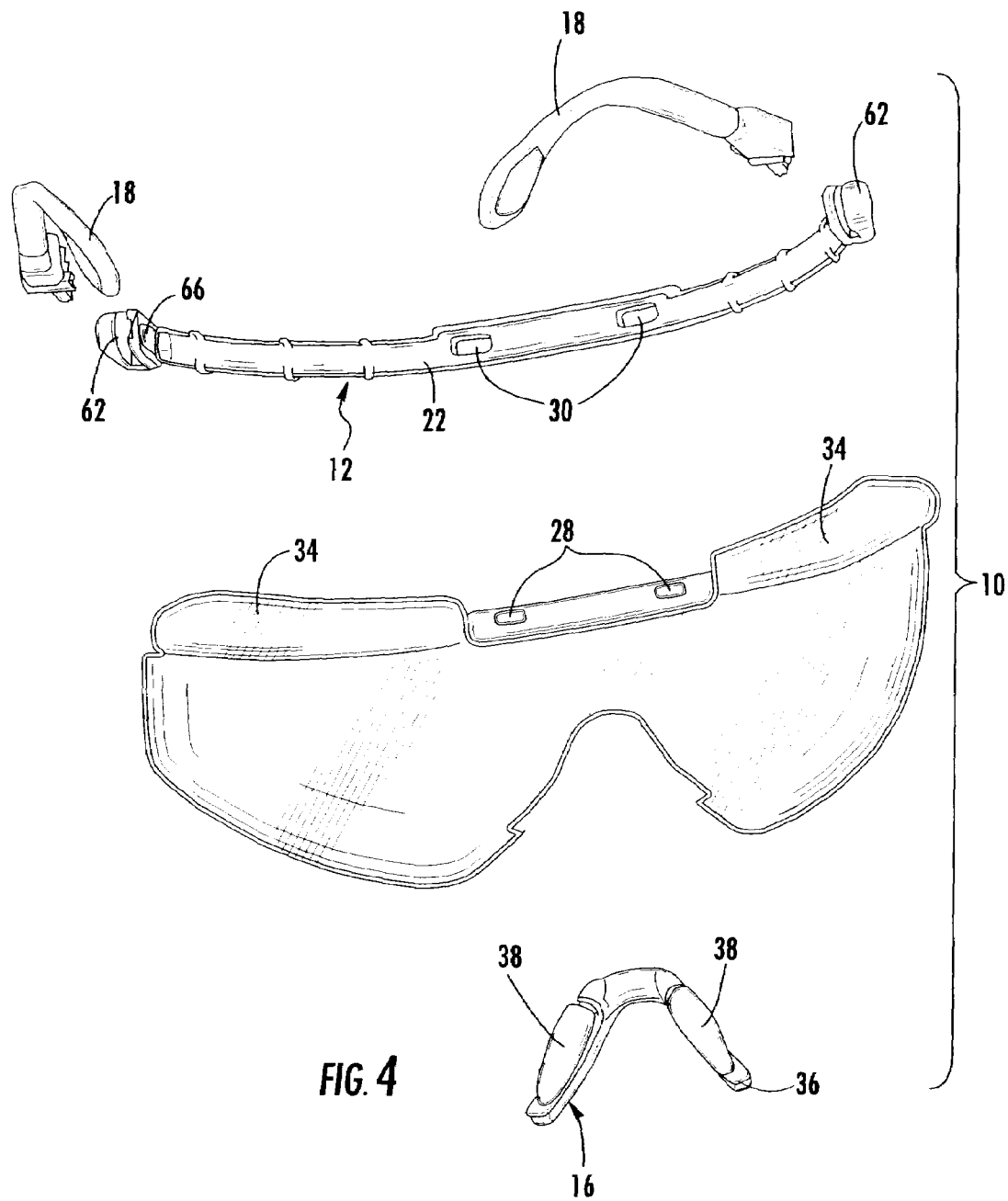
FIG. 4 is an exploded rear perspective view thereof.

Turning now to FIGS. 1–5, one of the unique features of the safety eyewear 10 of the present invention is the ability of the brow bar 12 to flex outwardly (see arrows 26 in FIGS. 1 and 2) thereby allowing the eyewear 10 to adapt to different brow width of the wearer. The functionality of this feature is further enhanced by the manner in which the brow bar 12 receives and retains the lens 14. The lens 14 comprises a single piece lens shield having left and right lens portions integrally connected by a nose bridge, which is secured to the brow bar 12 by two spaced detents 28 located on the top edge of the lens 14. The detents 28 are received into corresponding notches 30 on the front surface of the brow bar 12. Similarly, the detents 28 may also be formed on the brow bar 12 and the notches 30 may be formed on the lens 14 wherein the detents 28 are received into corresponding notches 30 formed in the back surface of the lens 14. A channel arm 32 extends forward from the brow bar 12 and downwardly over the front surface of the lens 14 to capture the lens 14 against the front surface of the brow bar 12 thereby retaining the lens 14 in assembled relation with the brow bar 14. This center anchoring arrangement allows the outer ends of the lens 14 to float relative to the outer ends of the brow bar 12. While the general concept of a centrally anchored lens 14 is not entirely new, it is noted that the brow bar 12 of the present invention is preferably molded from a plastic material that is sufficiently flexible so as to movable through at least a range of motion as illustrated in FIG. 2. Specifically, the brow bar 12 is sufficiently flexible to allow the temples 18 to be flexed from a static width W to a stretched width of W' allowing the eyeglasses 10 to accommodate a large range of wearers. While some of the prior art shows central anchoring of a lens for sunglasses, the brow bar and frame of these prior art sunglasses are generally stiff, and while allowing some degree of flexibility, do not allow the broad range of motion as illustrated in FIG. 2. More specifically, the materials selected for the present invention permit a range of motion of the temple bar of about 40–50 degrees measured from the anchor point 33 on the lens 14 as illustrated in FIG. 2.

As can best be seen in FIG. 2, when the eyewear is worn by a person with a large head, the terminal ends of the brow bar 12 can freely flex outwardly from W to W' as indicated by arrows 26 allowing the eyewear 10 to adapt to the proper size. To provide clearance to facilitate the outward flex of the brow bar 12, the upper edges of the left and right lens portions are provided with channels 34 or nests into which the brow bar 12 is guided during outward flexing. In addition to providing a cushioning effect, the soft bumpers 24 extend around on the front of the brow bar 12 also serve to prevent the brow bar 12 from fully deflecting into the nests 34 at the top of the lens 14. In this manner, the bumpers 24 act as stand-offs maintaining the brow bar 12 in a slightly spaced relation to the wall of the nests 34 allowing free airflow out the top of the lens 14 and allowing continued venting even when the brow bar 12 ins in a fully flexed position.

Figure 6A:
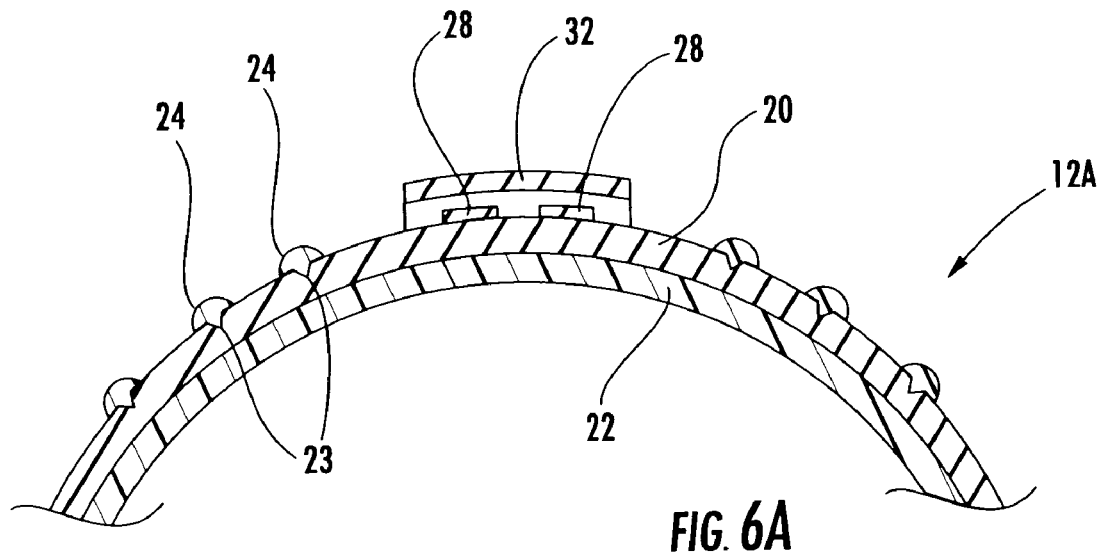
FIG. 6A is a cross-sectional view of the brow bar showing an alternative construction having reduced thickness areas beneath the soft elastomeric overmold to provide greater flex of the brow bar.

To further enhance the ability of the brow bar 12 to flex outwardly, an alternate embodiment brow bar 12A is shown in FIG. 6A wherein the brow bar 12A includes periodic weakened or narrowed regions 23 in the hard plastic material that facilitate deflection of the brow bar 12A. These weakened regions 24 may be arranges such that the elastomeric wrap around material 24 covers and conceals the weakened regions 23 while filling them with a softer more flexible elastomeric material.

Figure 7A:
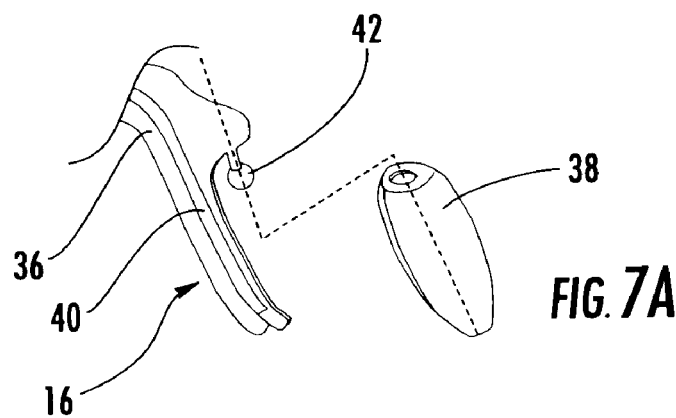
FIG. 7A is an exploded perspective view of the nose pad assembly.
Figure 7B:
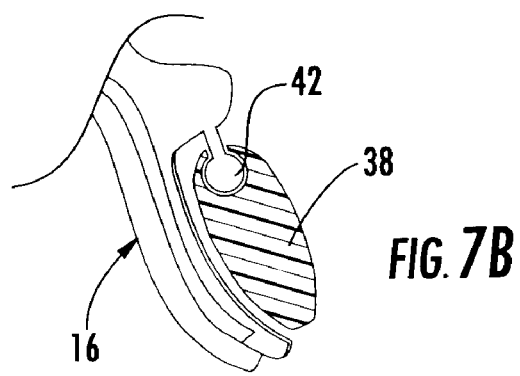
FIG. 7B is a cross-sectional view of the nose piece showing the nose pad and support molded in a two shot molding process.
Figure 13:
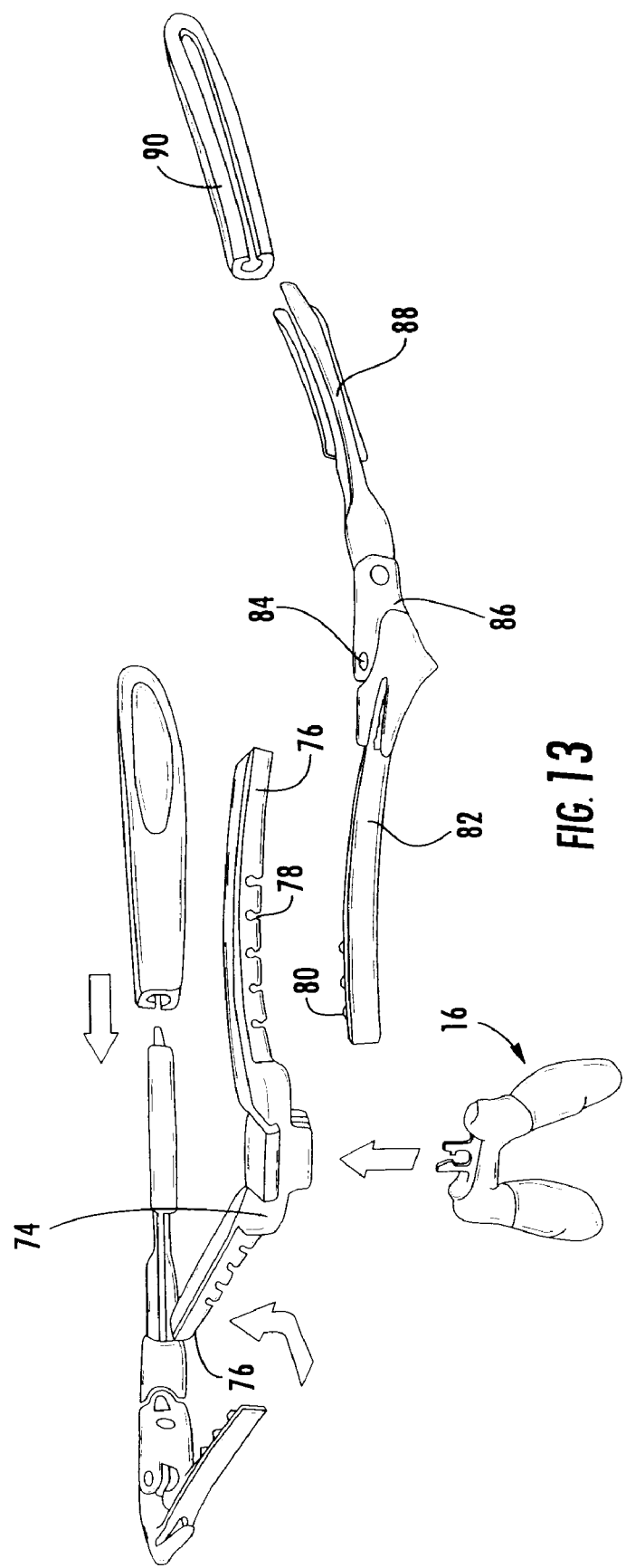
Figure 17:
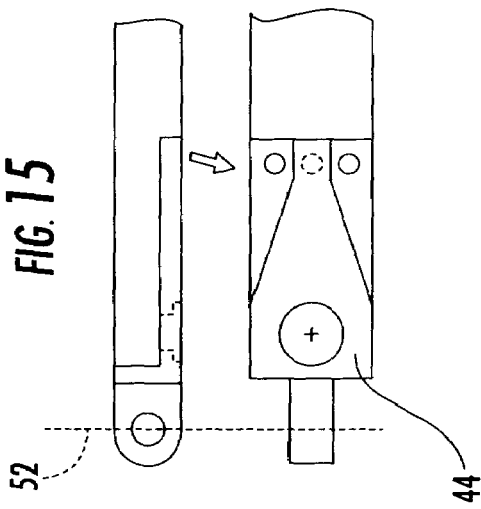
Figure 19:
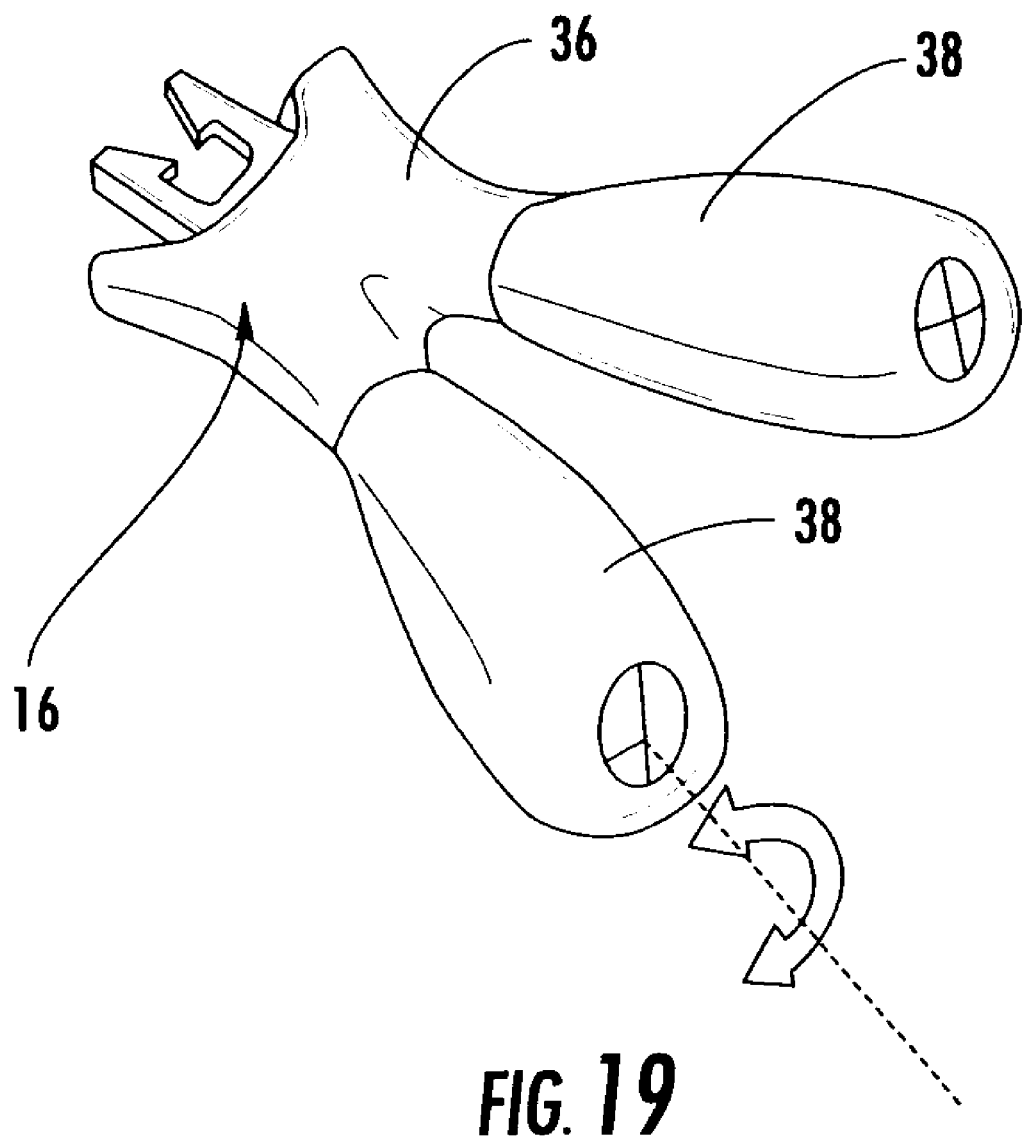
FIG. 19 is a perspective view of an alternate nose pad configuration that provides only for rotation of the nose pads.

The novel nose piece 16 of the present invention comprises a v-shaped rigid support portion 36 and two nose pads 38. The rigid support 36 is formed with a groove 40 that mates with the corresponding peripheral edges of the nose bridge on the lens 14 so that the nose piece support 16 is snap received onto the lens 14. The nose pads 38 are connected to the support by a unique ball and socket arrangement that allows 360 degree freedom of movement of the nose pad 38 relative to the support 36 as well as rotational movement of the nose pad 38. This greatly enhanced range of motion is an improvement in the present invention over the prior art and facilitates a nose piece that has increased comfort and adjustability for the wearer of the eyewear 10. While the ball and socket joint provides an enhanced range of adjustment, it is equally important to understand that the ball and socket joint must have some minimal level of friction as well so that the nose pad 38, once adjusted to a desired position, remains in the desired position. In the preferred embodiment as depicted in FIGS. 7A and 7B, the rigid support portion 36 is first molded to include the ball portion 42 of the ball and socket joint. Thereafter, the nose pad 38 is molded over the ball 42 to form the uniquely adjustable ball and socket assembly. This molding process could be completed as part of an insert molding process, or as preferred for the present invention, the molding process is completed within the same mold using retractable mold sections to mold the nose pad 38 directly over the ball element 42 without removing the support 36 from the mold, and thus create an assembled part directly within the mold. As described above, since the ball and socket joint must have some minimal level of friction between the parts, the molding process and the selection of materials becomes important to creating a functional part. In an alternative embodiment, the ball and socket formations can be reversed, with the nose pad 38 first being formed with the ball 42 and the support 36 being molded over the ball 42 on the nose pad 38. Further, in the context of using an insert molding technique, it is possible that the ball element 42 be comprised of a metal material and insert molded within the rigid plastic support 36. The plastic nose pads 38 could then be molded over the metal ball elements 42. Further still, the entire rigid nose support 16 could be constructed from metal and the plastic nose pads 38 molded over the ball elements 42. Additionally, while the rigid support portion 36 may be made from a hard polymer and the nose pads 38 may be made from an elastomer, the present invention also provides for both members to be formed of hard polymer or elastomer. An alternate embodiment as depicted in FIGS. 13, 17 and 19 further provides that the nose piece 16 snap into a central portion of the eyeglass frame rather than be received by the lens. Still further, it is possible that the nose pads 38 could be molded separately and then assembled by pushing them onto the ball 42.

Figure 7C:
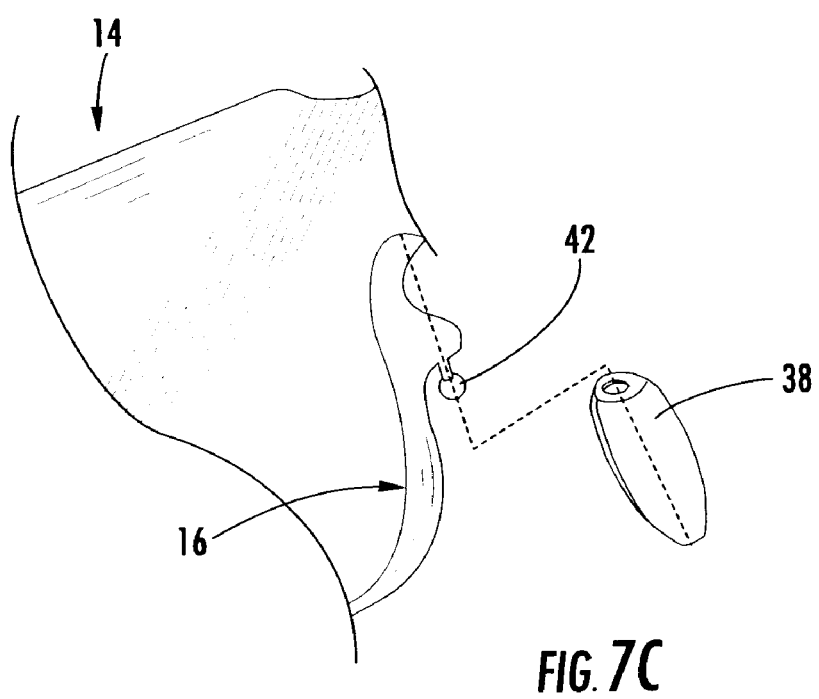
FIG. 7C is an exploded perspective view of an alternative construction of the nose pad assembly.

Other constructions of the ball and socket joint for the nose pad 38 are also contemplated. For example, FIG. 7C illustrates that the nose support 16 and the ball element 42 of the joint could be integrally molded as part of the lens 14, and the nose pads 38 could be molded over the ball elements 42. It is also possible to form a ball and socket joint by forming a plastic ball element, and slotting the ball element to provide relief slots. The slotted ball element could then be press fit into a cylindrical bore of slightly smaller dimensions formed within the nose pad 38. The slotted ball would be compressed providing a friction fit within the bore, retaining the ball in place and providing the required friction to allow adjustment but also retain the nose pad 38 in position once moved to the desired position. In yet other embodiments, the ball would not be slotted, but would be retained within the bore by an insert or a rod extending perpendicular to the bore.

Even further still, it is alternately contemplated that the nose pad 38 could be formed with a metallic insert at the upper end thereof. For example, a U-shaped metallic insert plate with two relief apertures could be insert molded within the nose pad 38. The ball element is then press fit between the plates and received in seated relation between the two relief apertures. In yet another construction, a metal ring could be molded into the nose pad 38 and the ball pressed through the ring for retention. While numerous different constructions have been described herein, these descriptions are not intended to limit the possibility of other ball and socket type constructions. The general inventive concept to be conveyed is that the ball and socket type joint provided between the nose pad 38 and the supporting structure 16 of the nose pad 38 provides a superior range of motion, adjustability and comfort not obtained with prior art constructions.

Figure 5:
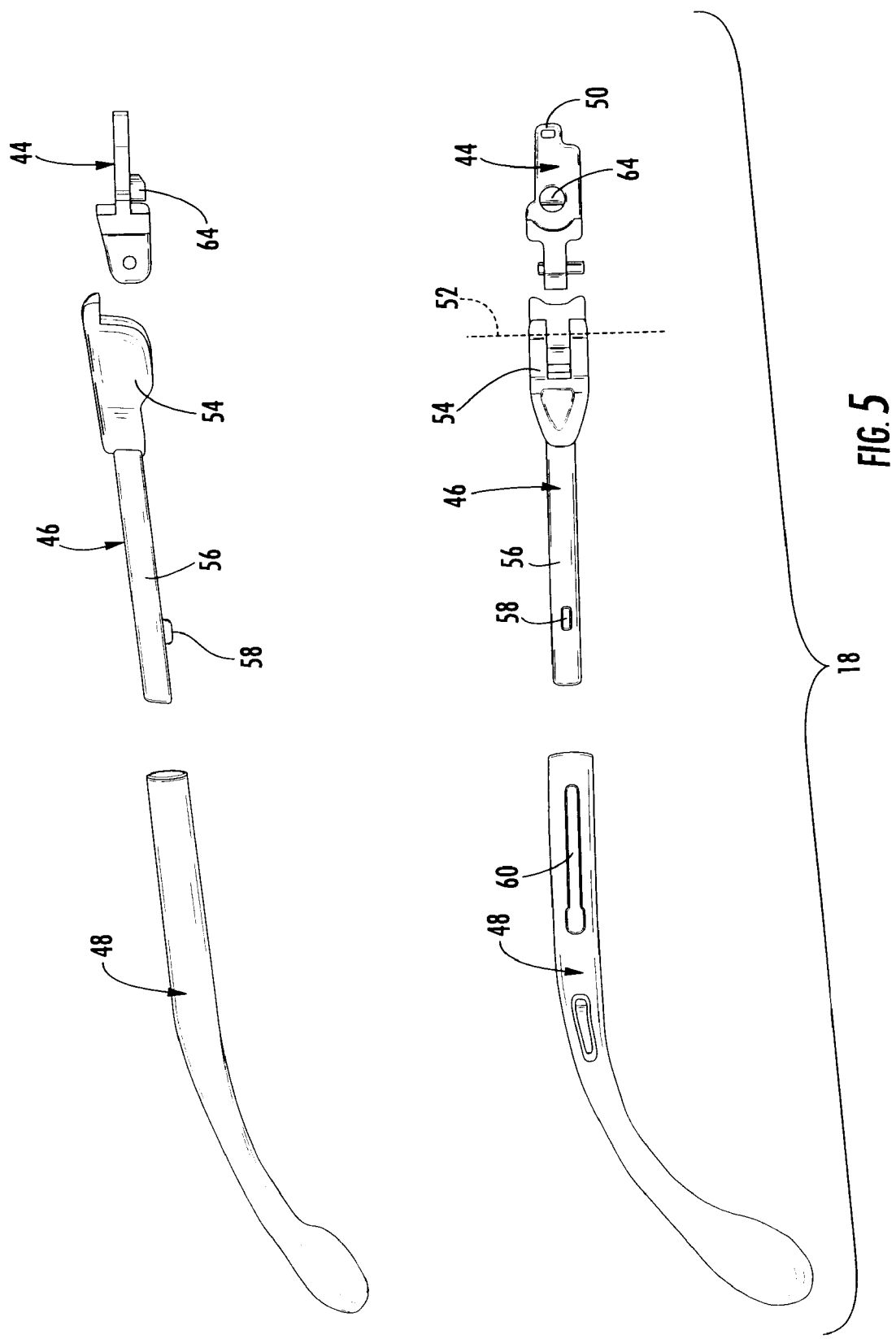
FIG. 5 is an exploded view of one of the temple bar assemblies.

Turning back to FIGS. 1–3 in combination with FIG. 5, the temple bar assemblies 18 include three separate elements, namely a ratchet body 44, a hinge body 46 and a cable portion 48. The temple bar assemblies 18 are configured so as to provide both an angular ratchet adjustment for adjusting the angle of inclination of the temple bars 18 relative to the brow bar 12 as well as a hinge for folding the temple bars 18 flat relative to the brow bar. In addition, the cable portion 48 of the temple bar assemblies 18 is adapted for telescoping adjustment relative to the hinge body 46. Generally speaking, the physical construction of the three part temple assemblies 18 is within the prior art. For example, an almost identical structure is illustrated in the U.S. Pat. No. 5,457,505 discussed hereinabove. In this prior art construction, the three components were molded separately and then assembled together to form a temple bar assembly. More specifically, the hinge connection had to be aligned and a hinge pin inserted to form the hinge point. Additionally, the cable had to be pressed onto the end of the temple body.

Figure 18:
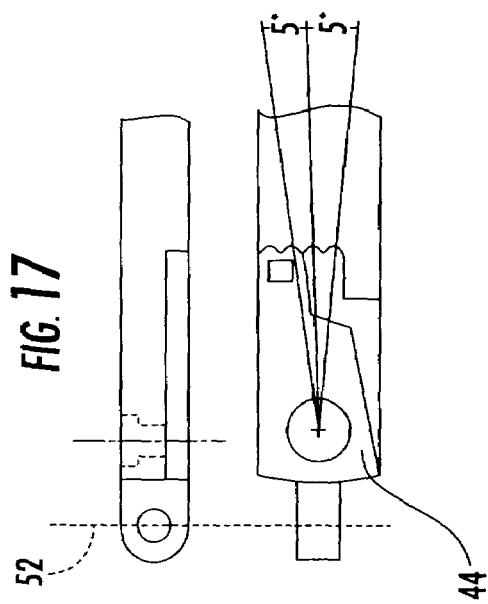
FIG. 18 is a plan view of an alternate telescoping temple length adjustment.
Figure 18A:
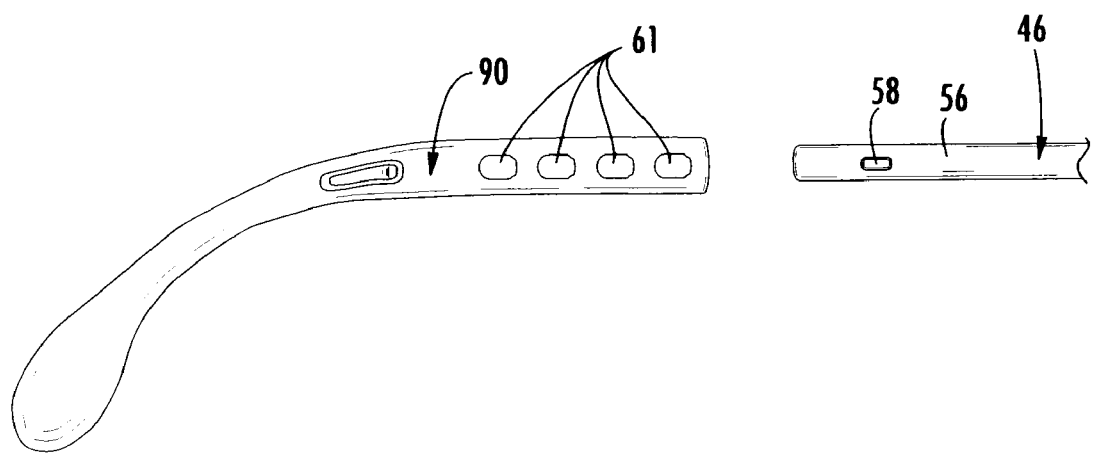
FIG. 18A is a plan view of a second alternate telescoping temple length adjustment.

For purposes of the present invention, the novelty resides in a unique method of construction the temple bar assembly 18 as a single integrated unit which is formed and assembled directly within the mold. In this regard, the three-part temple bar assembly 18 is formed using a novel three shot molding process wherein the ratchet body 44 is first molded from first rigid plastic material. The ratchet body 44 includes a ratchet formation 50 at the front end thereof and a hinge pin forming a vertical pivot axis 52 at the rear end. In a second shot of the molding process, the hinge body 46 is integrally molded (from a slightly different plastic material) over the rear end of the ratchet body 44 wherein the hinge eye 54 is integrally formed over the hinge pin within the mold. The rear end of the hinge body 46 is provided with an elongated neck 56 that will become part of the telescoping cable structure. Finally, in a third step, a third (softer) elastomeric/plastic material is injected over the neck 56 to form the soft curved cable portion 48 of the temple bar. While in the preferred embodiment a soft elastomeric cable portion 48 is disclosed, clearly the cable portion 48 may also be formed from a hard polymer. To provide selected positioning of the cable 48 relative to the neck 56, the neck is provided with a detent 58, and the cable is provided with a series of positioning apertures 60. Alternately, the positioning aperture 60 may be a single elongated aperture. Similarly, in FIG. 18, another alternate cable 90 positioning aperture 88 is shown. FIG. 18A shows yet another alternate cable 90 positioning arrangement wherein instead of providing a single aperture, a plurality of apertures 61 are provided to allow the detent 58 to positively engage in one of the selected apertures 61. Because of the differences in the plastic materials used in the molding process, when the temple bar assembly 18 is removed from the mold, the hinge body 46 is pivotable with respect to the ratchet body 44, and the cable portion 48 is slidably movable relative to the neck 56 of the hinge body 46. No assembly is required once removed from the mold. To insure the proper operation and the required movement of each of the elements relative to one another after the molding process is completed, upon removal from the mold each of the joints of the temple bar 18 may be articulated to prevent the different polymers from bonding to one another.

Figure 15:
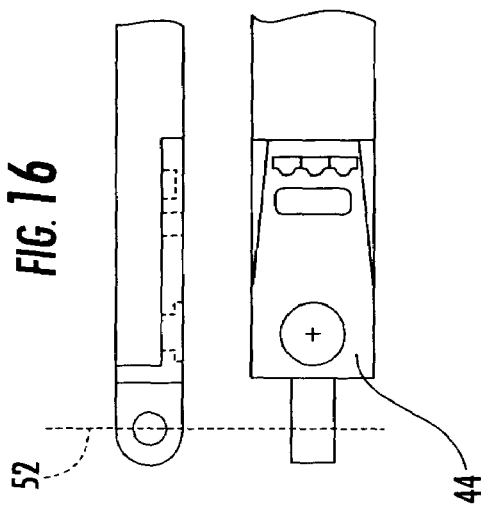
FIGS. 15–17 are plan views of alternate angular ratchet adjustment configurations that are formed using the in-mold-assembly techniques of the present invention.
Figure 16:
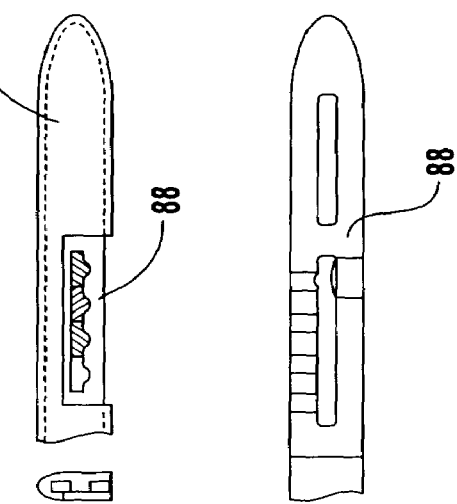

The temple bar assemblies 18 are then assembled with the brow bar 12 by snapping the respective ratchet body 44 of the left and right temple bar assemblies into mating slots 62 on the terminal ends of the brow bar 12. The ratchet body 44 includes a pivot post 64 received in a pivot aperture 66 to form a pivot point similar to those ratchet assemblies found in the '681 and '235 patents referenced hereinabove. Alternate configurations of the ratchet body 44 and formations 50 can be found in FIGS. 15, 16 and 17. It is important to note that the functional elements of the ratchet body 44 may be formed in a position either ahead of the hinge pivot 52 positioned between the brow bar 12 and the hinge pivot 52 or in a position behind the hinge pivot 52 between the reduced neck 56 and the hinge pivot 52. This flexible placement of the ratchet body 44 allows flexibility in design as well as facilitating the ability to also form the entire ratchet assembly (body 44 and ratchet receiver 62) utilizing IMA techniques and methodology.

Figure 8A:
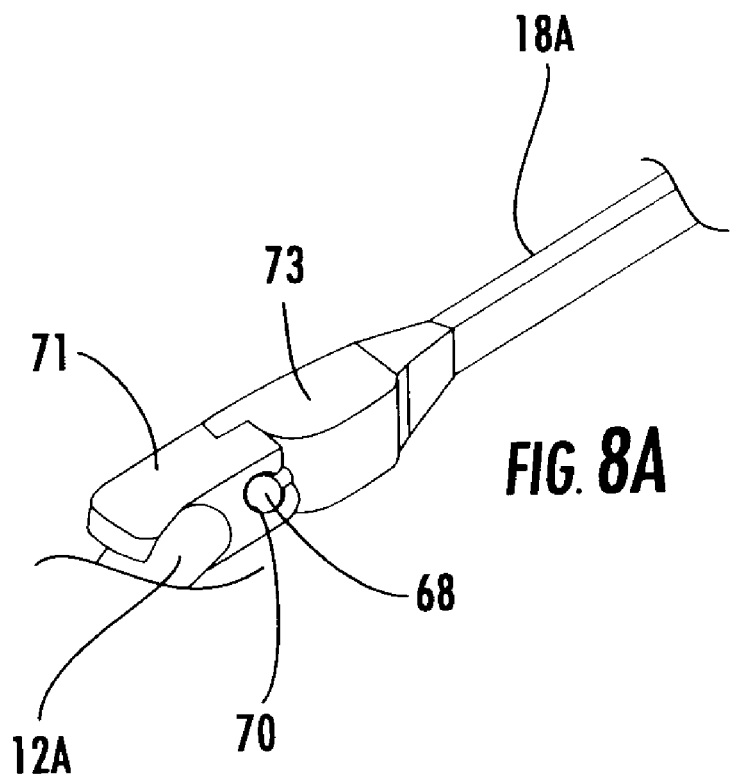
FIGS. 8A and 8B are perspective views of an alternate ball and socket connection between the temple bar and the brow bar.
Figure 8B:
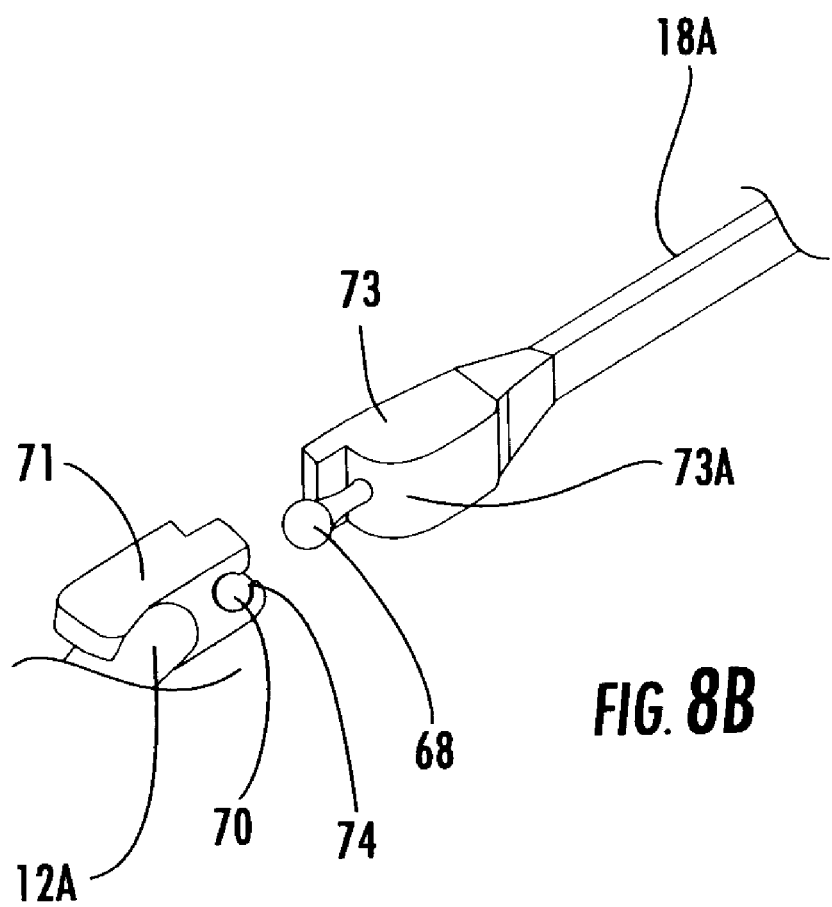
Figure 9A:
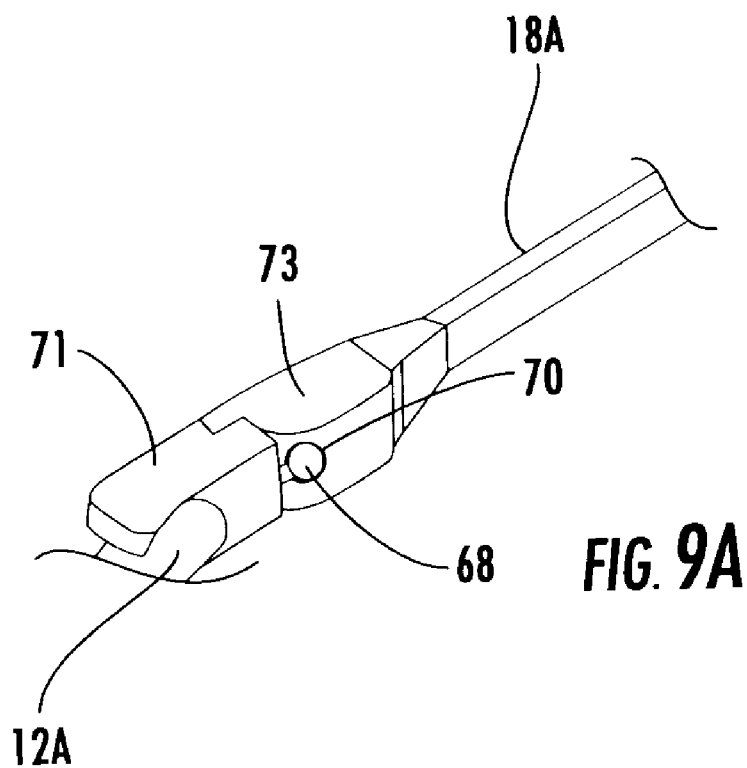
FIGS. 9A and 9B are another alternate perspective of a ball and socket connection between the temple bar and the brow bar.
Figure 9B:
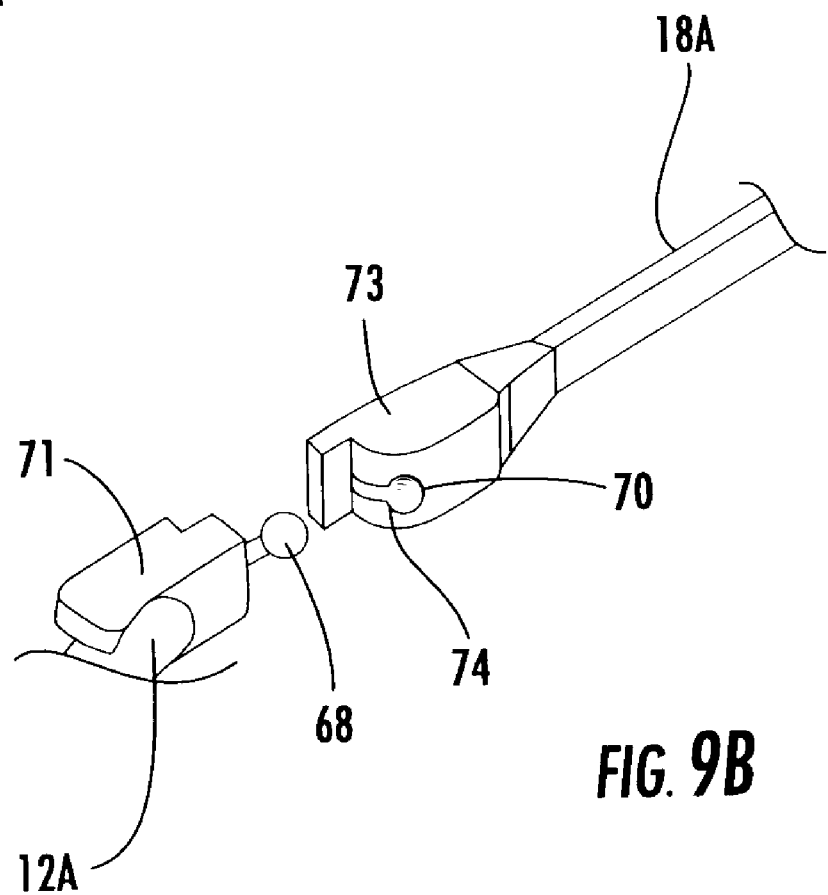

Referring to FIGS. 8 and 9, further disclosed embodiments of the invention include a novel brow bar 12A and temple bar assembly 18A that is molded in a two shot process with a ball 68 and socket 70 connection rather than a ratchet and hinge. In the embodiment shown in FIGS. 8A and 8B, the temple bar neck and rear portion 73 are preferably molded in a first molding step wherein the front end of the rear portion 73 includes a ball formation 68. Thereafter, the front portion 71 is molded over the ball 68 to form a socket formation 70 surrounding the ball 68. The facing surfaces of the temple bar 18A and brow bar 12A are curved on selected surface to allow relative rotation and movement, and in addition, the front portion 71 is provided with a slot 74 on the inner side thereof to permit a hinge/pivot movement of the temple bar 18A similar to a conventional hinge. The particular arrangement as shown includes a curved side surface 73a on the rear portion 73 which permits pivoting movement along a vertical axis. It should be noted that the upper and lower surfaces at the front edges of the rear portion are also somewhat rounded to generally permit pivoting of the rear portion as a true ball and socket joint. This two shot process would eliminate the separate formation of the hinge body and would thus reduce cost and simplify manufacture. Similarly, as disclosed above, the cable ends 48 may be molded over the temple bar 18 to form telescoping temple adjustment. The reverse arrangement of the ball and socket joint is shown in FIGS. 9A and 9B wherein the ball formation 68 is formed on the front portion 71 and the rear portion 73 is molded the ball 68 to create a socket 70.

Figure 10:
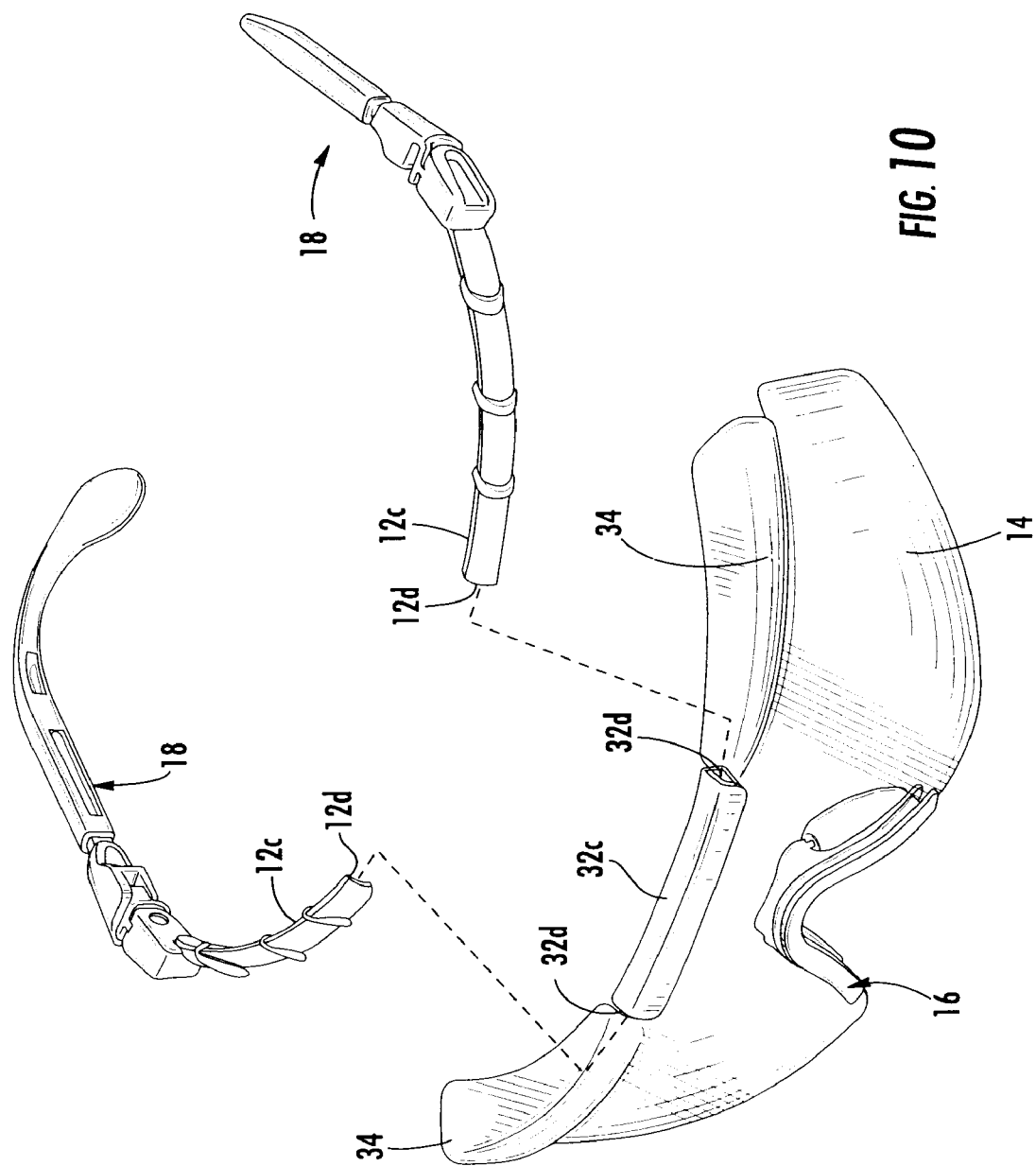
FIG. 10 is a perspective view of an alternate embodiment of the safety eyewear having a two part brow bar with snap in sockets on bridge of lens.

Referring to FIG. 10, a second alternate embodiment brow bar 12c is shown wherein the brow bar 12c is made in two pieces. The lens 14 is formed to include a receiver channel 32c along the top edge thereof wherein the receiver channel 32c includes openings 32d in its ends that are configured and arranged to receive and frictionally retain the terminal ends 12d of the two brow bar segments 12c.

Figure 11:
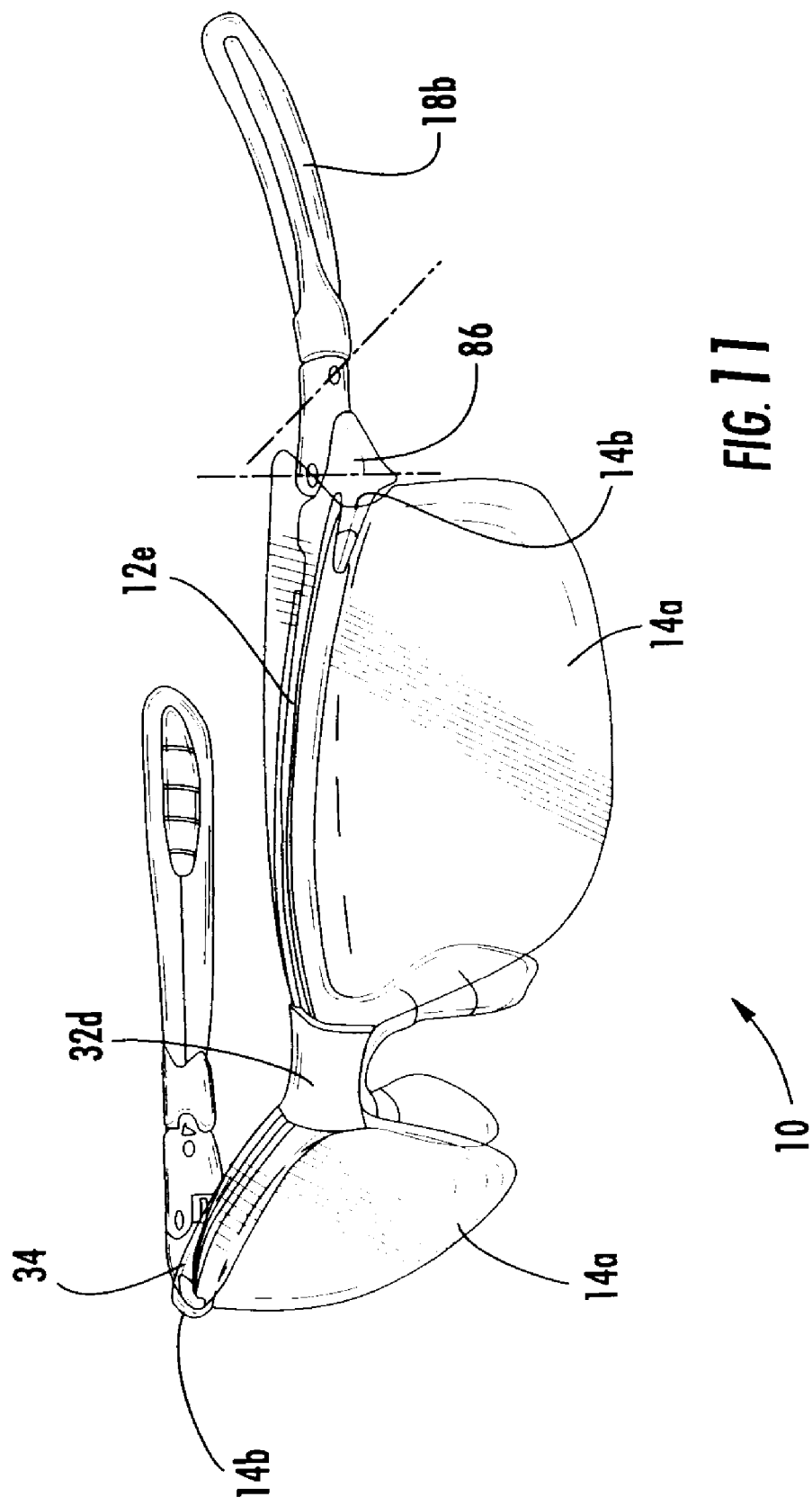
FIGS. 11–14 are perspective views of alternate embodiments of the safety eyewear having a telescoping brow bar configurations.

In another alternate embodiment as depicted in FIG. 11, the brow bar 12e is formed as a continuous member and the lens 14a is formed as a two piece lens. The two lenses 14a are centrally supported along the central portion of the brow bar 12e by any known support means such as the support clip 32d shown. The terminal ends 14b are free floating and not restrained or connected to the brow bar 12e thereby allowing the free flexing of the brow bar 12e in accordance with the teachings of the present invention. Additionally, the lenses 14a may include nests 34 along their top edges to allow room for the flexing of the brow bar 12e or may simply stop short at a point beneath the brow bar 12e.

Figure 12:
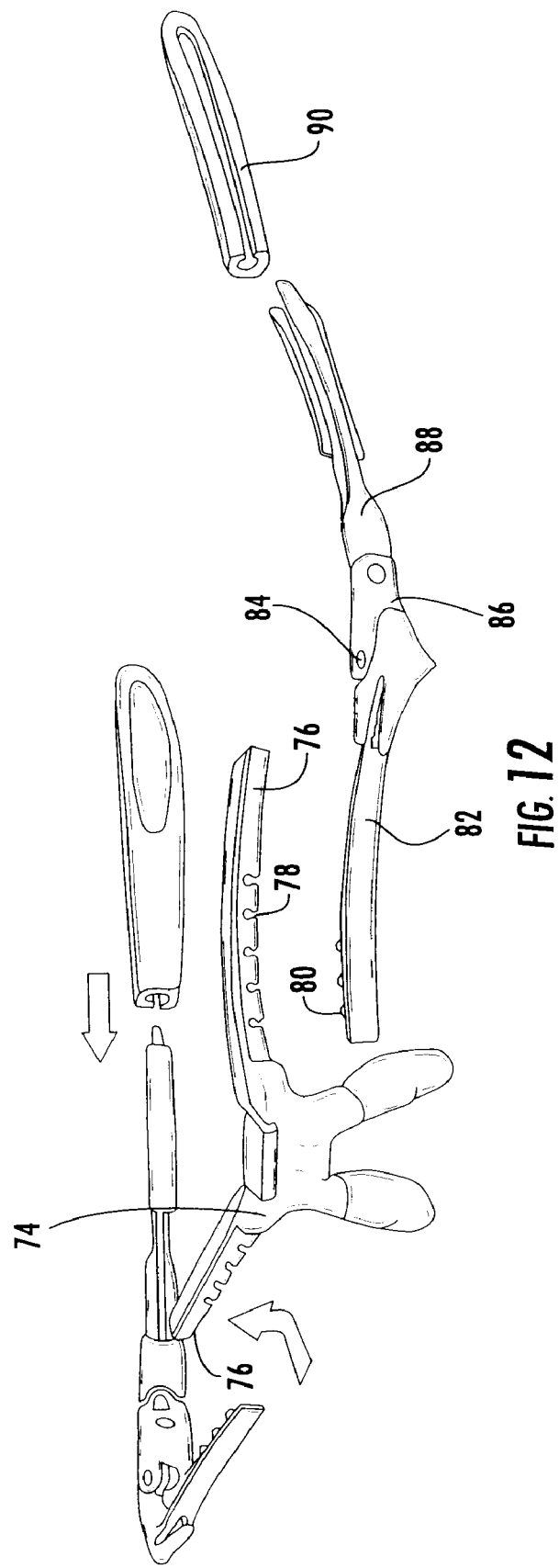
Figure 14:
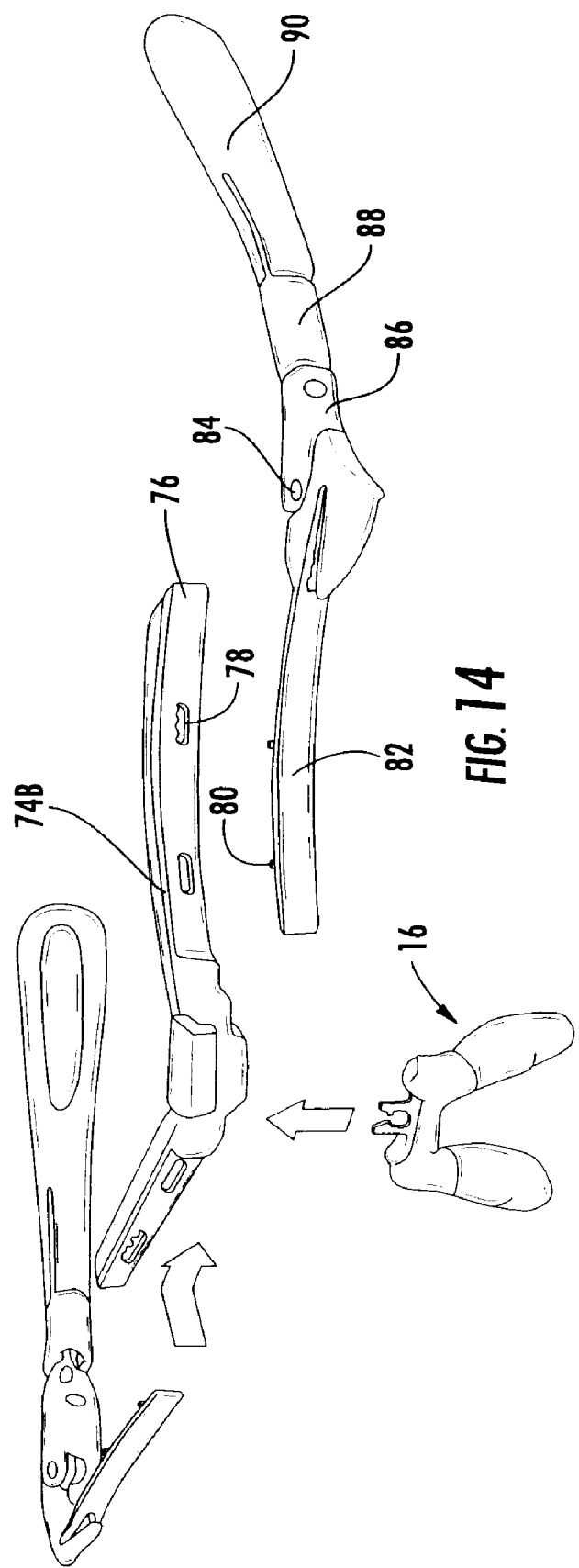

Turning now to FIGS. 12–14, several additional embodiments are disclosed wherein the brow bar 12B telescopingly adjusts for length. In this regard, a central bridge portion 74 of the brow bar 12B includes left and right temple extensions 76. Each temple extension 76 includes notches or slots 78 for receiving a mating pin formation 80 provided on a mating temple extension 82 of the temple bar assemblies 18. It is noted that the temple bar assemblies 18 in this embodiment are formed in a four part molding processes wherein the mating temple extension 82 is formed first having a hinge pin 84 formed at the rear end, followed by a hinge body 86, the temple bar 88 as depicted in the detail in FIG. 6 includes a ratchet formation at the front end, and a telescoping cable end 90.

It can therefore be seen that the present invention discloses a novel and creative use of multi-shot molding techniques to provide integrally molded yet movable parts, as well as to provide both decorative and functional cushioned areas. For these reasons, the instant invention is believed to represent a significant advancement in the art that has substantial commercial merit.

What is claimed:

1. A flexible frame assembly for eyeglasses comprising:
an upper frame member formed from a first material, said frame member having first and second ends and a central portion extending between said first and second ends, said central portion including a support region to receive and retain a lens assembly and at least one weakened region adjacent said support region wherein a cross sectional area of said upper frame member is narrowed to facilitate deflection of the upper frame member; and a cover layer formed from a second material disposed over at least said weakened region on said upper frame member, said second material having greater flexibility that said first material.

2. The flexible frame assembly of claim 1, wherein said support region is located in the center of the upper frame member and said upper frame member includes at least two weakened regions, one weakened region disposed between said first end of said upper frame member and said support region and one weakened region disposed between said second end of said upper frame member and said support region.

3. The flexible frame assembly of claim 1, wherein said support region is located in the center of the upper frame member and said upper frame member includes a plurality of weakened regions, at least two of said plurality of weakened regions disposed between said first end of said upper frame member and said support region and at least two of said plurality of weakened regions disposed between said second end of said upper frame member and said support region.

4. The flexible frame assembly of claim 1, said upper frame member being formed in a two shot injection molding process, wherein said central region is injection molded from said first material to include said narrowed cross sectional area regions and said cover layer is injection molded over at least said narrowed cross sectional area regions from a second material.

5. The flexible frame assembly of claim 1, wherein said second material is an elastomeric material.

6. The flexible frame assembly of claim 5, wherein said cover layer is disposed over said weakened region on said upper frame member and over a rear surface of said upper frame member.

7. An eyeglass assembly having a flexible frame comprising:
    an upper frame member formed from a first material, said frame member having first and second ends and a central portion extending between said first and second ends, said central portion including a support region, at least one weakened region adjacent said support region wherein a cross sectional area of said upper frame member is narrowed and a cover layer formed from a second material disposed over at least said weakened region on said upper frame member, said second material having greater flexibility that said first material;
    a lens assembly affixed to said support region of said upper frame member; and
    first and second temple bars affixed to said first and second ends of said upper frame member respectively.

8. The eyeglass assembly of claim 7, wherein said support region is located in the center of the upper frame member and said upper frame member includes at least two weakened regions, one weakened region disposed between said first end of said upper frame member and said support region and one weakened region disposed between said second end of said upper frame member and said support region.

9. The eyeglass assembly of claim 7, wherein said support region is located in the center of the upper frame member and said upper frame member includes a plurality of weakened regions, at least two of said plurality of weakened regions disposed between said first end of said upper frame member and said support region and at least two of said plurality of weakened regions disposed between said second end of said upper frame member and said support region.

10. The eyeglass assembly of claim 7, said upper frame member being formed in a two shot injection molding process, wherein said central region is injection molded from said first material to include said narrowed cross sectional area regions and said cover layer is injection molded over at least said narrowed cross sectional area regions from a second material.

11. The eyeglass assembly of claim 7, wherein said second material is an elastomeric material.

12. The eyeglass assembly of claim 7, wherein said cover layer is disposed over said weakened region on said upper frame member and over a rear surface of said upper frame member.

13. The eyeglass assembly of claim 7, said lens assembly further comprising:
    a lens body extending from said first end of said upper frame member to said second end of said upper frame member, said lens body having a central attachment region and a top edge; and
    first and second channels formed along said top edge of said lens body adjacent said central attachment region,
    said central attachment region of said lens assembly attached to said upper frame member only at said central support region, wherein said first and second ends of said upper frame member are not restrained by said lens assembly and can be deflected relative to said lens assembly,
    said first and second channels each defining a space to receive said first and second ends of said upper frame member when said upper frame member is deflected.

14. The eyeglass assembly of claim 13, wherein said cover layer over said weakened regions extends beyond a front surface of said upper frame member forming stand-offs wherein said stand-offs contact an inner surface of said lens assembly when said upper frame member is deflected preventing said upper frame member from contacting said inner surface of said lens assembly.

15. The eyeglass assembly of claim 14, wherein said stand-offs form venting channels between said upper frame member and said inner surface of said lens assembly when said upper frame member is deflected outwardly.

* * * * *